Figure 4:
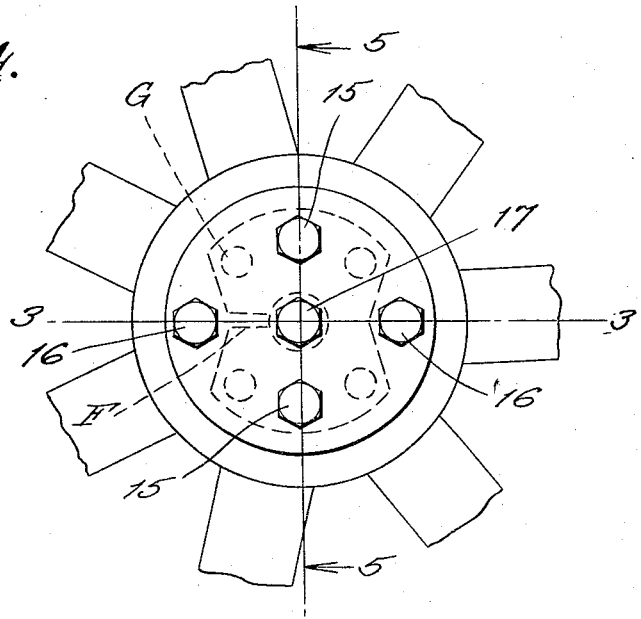

Sept. 7, 1926.  
M. K. MALONE  
TRACTOR WHEEL AND BUSHING PULLER  
Filed March 2, 1925　　2 Sheets-Sheet 1
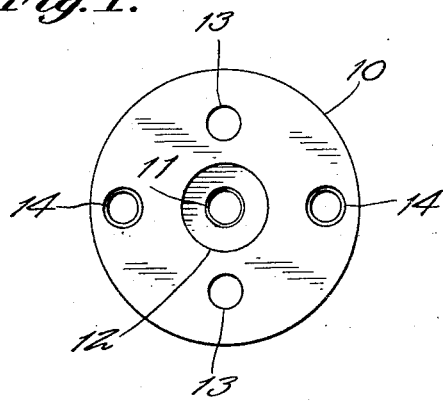
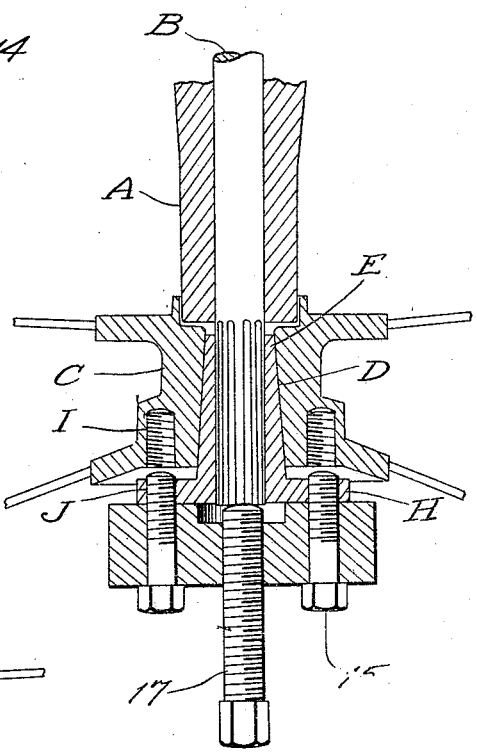
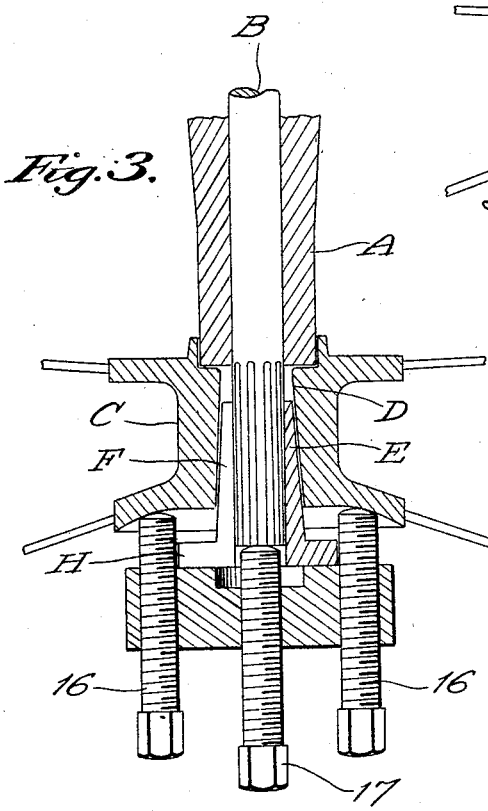
Mackey K. Malone  
INVENTOR  
BY Victor J. Evans  
ATTORNEY
WITNESS:

Sept. 7, 1926.

M. K. MALONE 1,599,340

TRACTOR WHEEL AND BUSHING PULLER

Filed March 2, 1925      2 Sheets-Sheet 2

Mackey K. Malone
INVENTOR

BY Victor J. Evans
ATTORNEY

WITNESS:

Patented Sept. 7, 1926.

1,599,340

UNITED STATES PATENT OFFICE.

MACKEY K. MALONE, OF WILLS POINT, TEXAS, ASSIGNOR OF ONE-HALF TO NOEL J. TOMLIN, OF WILLS POINT, TEXAS.

TRACTOR WHEEL AND BUSHING PULLER.

Application filed March 2, 1925. Serial No. 12,768.

This invention relates to tools and particularly to those of the puller type, and has for its object the provision of a novel device designed for use in removing the rear wheels of a tractor and extracting the bushings therefrom.

It is well known that a certain type of tractor has the rear wheels mounted upon the rear axle or spindles through the instrumentality of a tapered bushing which fits within a tapered bore in the wheel hub and which has longitudinally extending ribs fitting within grooves in the outer ends of the axle or spindle, the securing action being effected by means of studs which are passed through an outstanding flange on the bushing and into threaded sockets or holes in the hub, the insertion of these studs resulting in relative movement of the wheel hub and bushing so that the bushing, which is split, will be contracted into firm engagement with the axle or spindle by the coaction of the tapered surfaces of the bushing and hub bore.

It of course occurs in practice that it becomes necessary to remove a wheel or the bushing in the course of repairing and under ordinary circumstances this is a troublesome job requiring unusual care and skill to avoid breakage of the parts. It is with the above facts in view that I have designed the present invention which has for its object the provision of a novel screw actuated device adapted to be engaged with the hub bushing and hub and also with the spindle or axle whereby a proper pressure or combination of pressure may be effected for the purpose of releasing the clamping engagement of the bushing with the hub so that both may be removed from the axle or spindle.

An important object is the provision of a tool of this character which is provided with a plurality of screw members which operate in such manner as to relieve any of the parts from undue strain and to equalize the pressure exerted so that the operation of effecting removal of the wheel and bushing will be a simple one and not likely to cause damage to any of the parts.

An additional object is the provision of a tool of this character which will be simple and inexpensive in manufacture, easy to apply and use, positive in action, efficient and durable in service, and a general improvement in the art.

With the above and other objects and advantages in view, the invention consists in the details of construction to be hereinafter more fully described and claimed, and illustrated in the accompanying drawings in which:—

Figure 5:
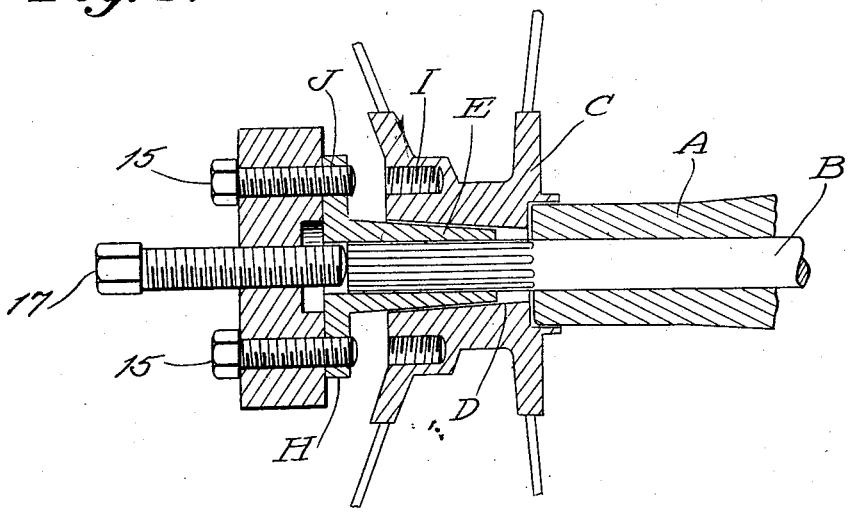

Figure 1 is an elevation of the main member of the puller alone,

Figure 2 is a longitudinal section through a portion of the axle housing of a tractor showing the rear spindle or axle, a rear wheel hub and bushing all in their proper association, this view also illustrating the first step involved in applying the puller, Figure 3 is a section taken on the line 3—3 of Figure 4, Figure 4 is a plan view of the puller showing it in applied position upon the wheel, Figure 5 is a cross section on the line 5—5 of Figure 4.

Referring more particularly to the drawings, the letter A designates a portion of the rear axle housing of a tractor, B represents the rear axle or spindle journaled through this housing and projecting beyond the end thereof, while C designates the hub of the rear wheel, which hub has a tapered bore D therein receiving a tapered bushing E which is split, as shown at F and which is normally secured with respect to the hub of the wheel by means of a plurality of studs, not shown, which are passed through suitable holes G in an outstanding flange H on the bushing and screwed into sockets I in the hub C. The flange H is also provided with threaded holes J provided for the purpose of permitting attachment of a puller or other means for effecting removal of the parts.

In carrying out my invention I provide a supporting member which is or may be formed preferably as a fixed disc 10 having a central threaded hole 11 therein surrounded by a countersunk hole 12. At diametrically opposite points the disc is formed with smooth holes 13, and still another pair of holes 14 which are threaded. The disc 10 is of greater diameter than the flange H of the bushing E and the hole 11 is intended to be arranged axially of the axle or spindle B with the holes 13 alining with the holes J and with the holes 14 located at points outwardly of the sides of the bushing flange H.

I further make use of a pair of screws or studs 15 passed through the holes 13, a pair of screws or studs 16 threaded into the holes 14 and a single screw or stud 17 threaded into the central hole 11.

In the operation of pulling the wheel and bushing by means of this tool, it is first necessary to remove the studs which hold the flange H of the bushing onto the hub C of the wheel. After this is done, the disc member 10 forming the main member of the puller is disposed against the hub or bushing flange H and the studs 15 are passed through the holes 13 and are screwed into the threaded holes J in the flange H to a sufficient extent to maintain the disc 10 in association with the bushing. The screws or studs 16 are then threaded in until they engage against the outer surface of the hub and are then further turned down successively a part of a rotation at a time so that a substantially uniform pressure may be exerted against the outer face of the wheel hub. This action is continued until after a short period of action the bushing will snap loose from its place in clamping engagement with the hub and spindle or axle. The stud or screw 17 is then turned down and in a short time the bushing will be withdrawn from the spindle, the bushing remaining attached to the puller by means of the studs or screws 15. It is then of course a simple matter to slide off the wheel and the work is completed. In some instances, it is known that the rear spindle projects somewhat beyond the bushing and it is for this reason that I have provided the countersink 12 which will accommodate the projecting end of the spindle or axle when the device is initially placed in position.

From the foregoing description and a study of the drawings it will be apparent that I have thus provided a simply constructed, inexpensive and very easily operated tool which will be powerful for the purpose specified and which will greatly facilitate the removal of the rear wheels and bushings of a tractor so that repairs, adjustments or replacements may be made when necessary. Owing to the provision of the plurality of the screws it is quite evident that the strain exerted thereby will be more or less evenly divided and stripping of the threads or breakage of any of the parts consequently prevented.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. A tool for removing a rear wheel and wheel bushing from the spindle of a tractor, comprising a member disposable against the bushing, a plurality of studs carried by said member and adapted to be threaded into holes in the bushing, other studs threaded through said member and adapted to be engaged against the outer face of the wheel hub, and a screw extending through said member and adapted to be engaged against the outer end of the tractor spindle.

2. A tool for removing a rear wheel and wheel bushing from the spindle of a tractor, comprising a member disposable against the bushing, a plurality of studs carried by said member and adapted to be threaded into holes in the bushing, other studs threaded through said member and adapted to be engaged against the outer face of the wheel hub, and a screw extending through said member and adapted to engage against the outer end of the tractor spindle, said last named screw being centrally located, and the face of the member toward the bushing being formed with a countersink at said central hole.

3. A tool for removing the rear wheel and axle bushing from the spindle of a tractor, the bushing having an outstanding flange provided with threaded holes, comprising a disc member disposable against the bushing, a pair of studs passed through said member and engageable through said holes in the bushing flange, a second pair of studs screwed through said member and located at 90 degrees from the first named studs and adapted to engage against the outer face of the wheel hub, and a central stud threaded through said disc and adapted to engage against the outer end of the tractor spindle.

In testimony whereof I affix my signature.

MACKEY K. MALONE.